(12) United States Patent
Tsai

(10) Patent No.: US 8,276,173 B2
(45) Date of Patent: Sep. 25, 2012

(54) SYSTEM AND METHOD FOR PROCESSING PROGRAM INCLUDING ADVERTISEMENTS

(75) Inventor: Dong-Jie Tsai, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 234 days.

(21) Appl. No.: 12/496,324

(22) Filed: Jul. 1, 2009

(65) Prior Publication Data

US 2010/0005487 A1 Jan. 7, 2010

(30) Foreign Application Priority Data

Jul. 4, 2008 (TW) .............................. 97125318 A

(51) Int. Cl.
*H04H 60/33* (2008.01)
*H04N 7/16* (2006.01)
*H04N 7/10* (2006.01)
*H04N 7/025* (2006.01)
*H04N 5/445* (2006.01)
*H04N 7/173* (2006.01)
*G06F 13/00* (2006.01)

(52) U.S. Cl. .................. 725/13; 725/9; 725/32; 725/37; 725/38; 725/61; 725/105; 725/60

(58) Field of Classification Search .................. 725/13
See application file for complete search history.

(56) References Cited

U.S. PATENT DOCUMENTS

| 6,950,623 B2 | 9/2005 | Brown et al. | |
| 2002/0178447 A1* | 11/2002 | Plotnick et al. | 725/36 |
| 2004/0045020 A1* | 3/2004 | Witt et al. | 725/13 |
| 2004/0185777 A1* | 9/2004 | Bryson | 455/41.1 |
| 2006/0020961 A1 | 1/2006 | Chiu | |
| 2007/0115391 A1 | 5/2007 | Anderson | |
| 2008/0155585 A1* | 6/2008 | Craner et al. | 725/32 |

FOREIGN PATENT DOCUMENTS

| CN | 2867450 Y | 2/2007 |
| CN | 1972419 A | 5/2007 |
| TW | 200423732 | 11/2004 |
| TW | 200529625 | 9/2005 |
| TW | I255142 | 5/2006 |

OTHER PUBLICATIONS

Taiwan Patent Office, Office Action, Dec. 5, 2011, Taiwan.

* cited by examiner

*Primary Examiner* — Justin Shepard
(74) *Attorney, Agent, or Firm* — WPAT., P.C.; Justin King

(57) ABSTRACT

A system and a method for processing a program with inserted advertisements are provided. The system includes a plurality of program subscriber apparatuses, an advertising time server and a program-processing device, all of which are in communication with a network. At first, the program subscriber apparatuses generate a plurality of advertising time information in response to the operations of the program subscriber apparatuses by users. Then, the advertising time database integrated the advertising time information to provide an advertising time database having therein a plurality of representative advertising time information. The program-processing apparatus can process a specific program according to the representative advertising time information.

15 Claims, 5 Drawing Sheets

SYSTEM AND METHOD FOR PROCESSING PROGRAM INCLUDING ADVERTISEMENTS

FIELD OF THE INVENTION

The present invention relates to a system and method for processing video programs, and more particularly to a system and method for processing video programs to remove advertisements inserted in the video programs.

BACKGROUND OF THE INVENTION

With rapid increasing amount of TV channels and TV programs in recent years, it is possible that more than one program of interest are broadcast on different channels simultaneously. The viewer has to choose one program among those or frequently switch between different channels. Moreover, it is difficult for modern humans to watch programs at fixed time daily or weekly in their busy lives. Scheduled recording is the most convenient method to solve these problems. The TV program subscribers may watch desired programs after the broadcast. When digital video recorders equipped with hard drives are developed, the video data capacity may easily reach several tens of hours. Hence, it usually occurs that more and more programs are recorded in the hard drive and the viewer has no time to review all the recording contents. For example, advertisements inserted in the TV programs are bothersome and always be skipped by pressing the forward button or rotating the speed knob in the forward direction. Besides, the advertisements waste the space on the recording media.

Some recording methods are developed to remove the advertisements by means of image analysis. The advertisements may be detected according to black frames or audio discontinuity. However, the accuracy varies with the contents of the programs and the advertisements. US 2006/0020961 A1 and Taiwanese Patent No. I255142 teach methods for detection of advertisements using the features that the start portions and end portions of the program sections usually repeat, or the advertisements are usually shown in fixed time intervals. However, video signals of TV programs are too complicated and changeable to be accurately recognized and analyzed. Misjudgments usually occur during the advertisement detection which can also be a problem. Although manual operation can reduce the misjudgments, great amount of staff costs derive from numerous channels and broadcast stations and long-time detection. How to effectively detect the advertisements inserted in the TV programs is desired to solve the problems.

SUMMARY OF THE INVENTION

An object of the present invention is to provide a system and a method for processing programs with advertisements inserted therein. The advertising time can be effectively determined by a statistical method.

Another object of the present invention is to provide a system and a method for detecting advertisements inserted in TV programs. The advertising time can be effectively determined by a statistical method.

A third object of the present invention is to provide a method for determining an advertising time of advertisements inserted in TV programs. The determination is based on user's operation without detecting the contents of the images.

In accordance with an aspect of the present invention, the program-processing system operated with a network includes an advertising time server and a program-processing device, both of which are in communication with the network. The advertising time server provides an advertising time data base having a plurality of representative advertising time information. Thus, the program-processing device can access the representative advertising time information from the advertising time database through the network. Then, the program-processing device processes a program according to the advertising time information corresponding to the program.

In an embodiment, the program-processing system further includes a plurality of program subscriber apparatuses in communication with the network. The program subscriber apparatuses generate a plurality of advertising time information in response to the operations of the program subscriber devices. For example, by pressing a PIP mode button or an advertisement button of the program subscriber device, the program subscriber apparatus may determine the possible start time and end time of an advertisement. The program subscriber apparatuses transmit the advertising time information to the advertising time server through the network so that the advertising time server can provide the advertising time database according to the advertising time information.

In accordance with another aspect of the present invention, the program-processing method includes s step of providing an advertising time database having a plurality of representative advertising time information by integrating a plurality of advertising time information. The advertising time information is generated in response to the operations of a plurality of program subscriber apparatuses. After the representative advertising time information corresponding to a specific program is accessed from the advertising time database through the network, the program can be processed according to the representative advertising time information.

In an embodiment, the representative advertising time information is obtained by a statistical method.

In accordance with a further aspect of the present invention, the advertisement detection system includes a plurality of program subscriber apparatuses and an advertising time server in communication with the network. The program subscriber apparatuses generate a plurality of advertising time information in response to the viewers' operations. The advertising time server integrates the advertising time information to provide an advertising time database having therein a plurality of representative advertising time information.

In accordance with a further aspect of the present invention, the advertisement detection method includes steps of: generating a plurality of advertising time information in response to the operations of a plurality of program subscriber apparatuses by the viewers; and providing an advertising time database having therein a plurality of representative advertising time information obtained by integrating the advertising time information by a statistical method.

In accordance with a further aspect of the present invention, the method for determining an advertising time of an advertisement is provided. A start time of the advertisement is determined according to a user's first operation of the program subscriber apparatus. The first operation is to press a PIP mode button of the program subscriber apparatus to enter the program subscriber apparatus in a PIP mode and show the advertisement in a sub-frame. An end time of the advertisement is determined according to a user's second operation of the program subscriber apparatus. The second operation is to press the PIP mode button to cancel the PIP mode and show the TV program on the program subscriber apparatus in a normal mode.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
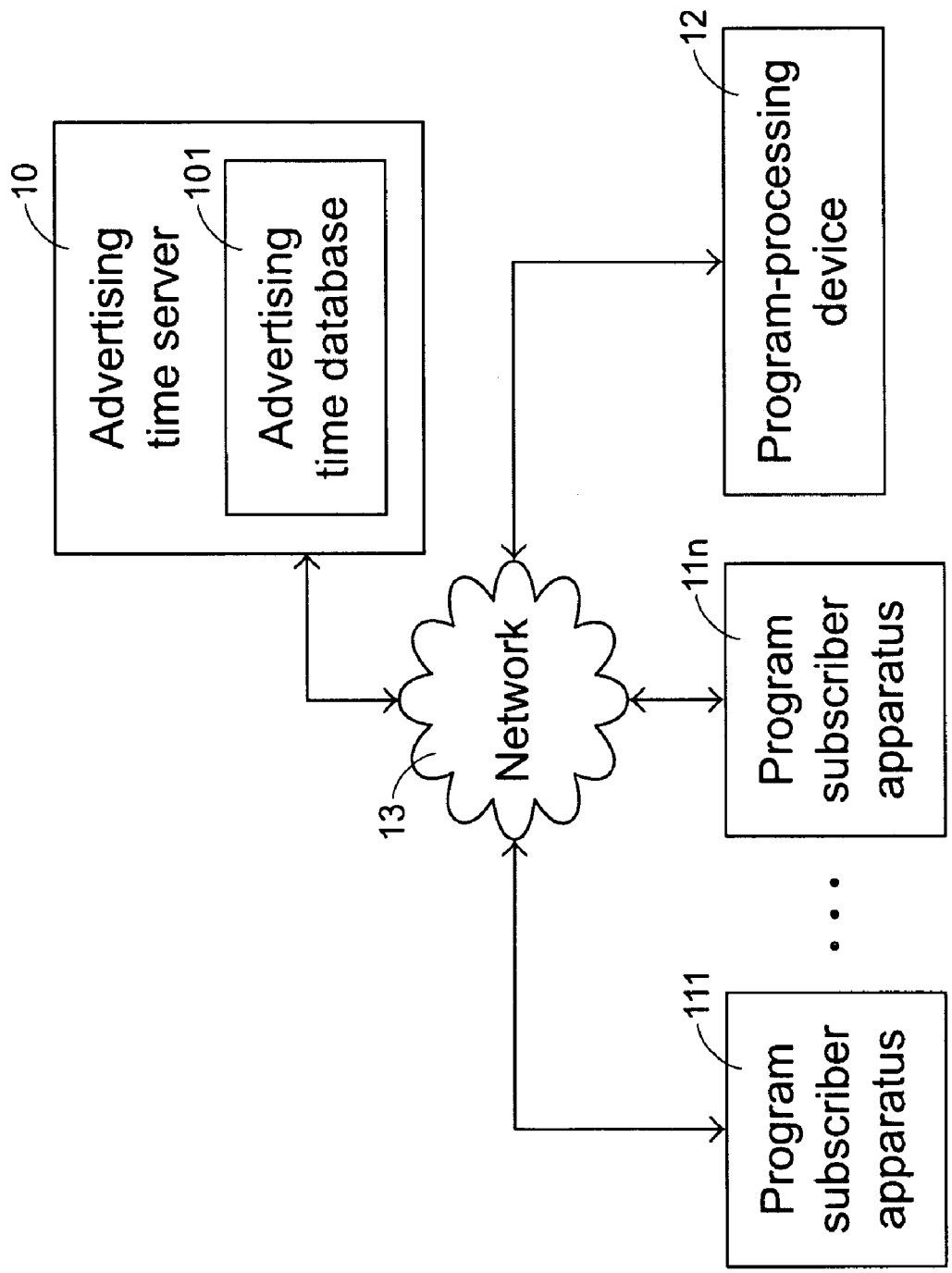
FIG. 1 is a block diagram illustrating a program-processing system according to the present invention.

Please refer to FIG. 1, a block diagram illustrating a program-processing system according to the present invention. The system includes an advertising time sever 10, a plurality of program subscriber apparatuses 111~11n and at least one program-processing device 12 in communication with each other via network 13. Each of the program subscriber apparatuses 111~11n may be a TV set, a computer and a set top box capable of accessing data through the network 13. The program subscriber apparatuses 111~11n receive (remote) control from the user, and determine and judge the possible advertising time based on the control operation by the user. The related control information or advertising time information is transmitted to the advertising time server 10. The advertising time server 10 collects the information from the plurality of program subscriber apparatuses 111~11n, and analyzes and integrates the information to provide an advertising time database 101. Therefore, the program-processing device 12 can process the program according to the information from the advertising time database 101 after the connection to the advertising time server 10 through the network 13.

Figure 2:
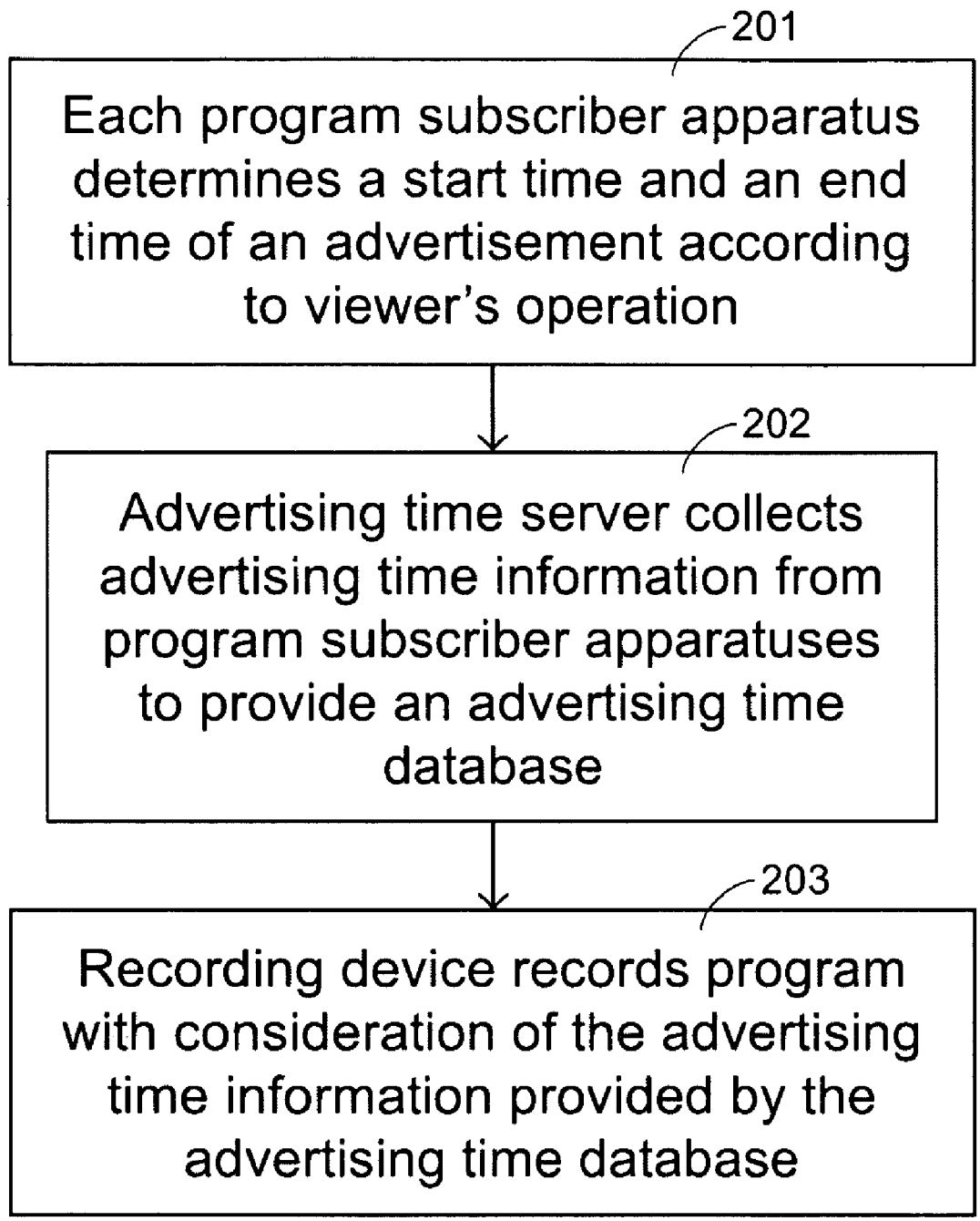
FIG. 2 is a flow chart showing a recording method using the program-processing system of FIG. 1.

In this embodiment, one function of the program-processing system is scheduled recording. Hence, the program-processing device 12 may be a recording device. A recording method applied to the program-processing system is illustrated in FIG. 2. In step 201, each of the program sub scriber apparatuses 111~11n detects the viewer's operation to estimate a start time and an end time of the advertisement broadcast on a particular channel. In step 202, the information including the estimate time of the advertisement is transmitted to the advertising time server 10. After the advertising time server 10 collects a certain amount of the information from different program subscriber apparatuses 111~11n, it performs a statistical method on the received information to provide the advertising time database 101 which stores many start times and end times of advertisements broadcast on different channels. In step 203, the recording device (program-processing device 12) is connected to the advertising time sever 10 to get from the advertising time database 101 the advertising time information of the advertisements inserted in the specific program broadcast on a designated channel. The recording device records the specific program according to the advertising time information. The recording device may stop recording during the advertising time, insert two markers, corresponding to the start and the end of the advertisement, to the recorded file to indicate that the interval between the markers belongs to the advertisement, or insert only one marker corresponding to the end of the advertisement so that the viewer can directly jump to the end of the advertisement during the playback. It is to be noted that the recording method is presented for illustration only; other program-processing method may be derived from the embodiment.

Hence, the present invention takes advantage of disguised human labor to determine the advertising time inserted in the programs. The system and method can reduce the misjudgment but do not increase staff costs. The program subscriber apparatuses 111~11n such as TV sets, computers or set top boxes may be provided by modifying the conventional TV sets, computers or set top boxes to have analysis function based on the viewer's operation. The operation means that the viewer operates the remote controller, the control panel, or the icons on media player to switch channel, change relative positions of main frame and sub-frame in picture-in-picture (PIP) mode, and the like. Such modification incurs almost no additional expense and it does not affect the operation manner of the viewer. Hence, the present system can be implemented in a convenient manner. The contents of the program and advertisement affect the accuracy of the detection of the advertisement according to the prior art based on analyzing the video signals or frames. On the contrary, the accuracy of the present invention is not affected by the contents of the program and advertisement because human eyes can easily distinguish the advertisement from the program. The network may be selected form wide area network (WAN), metropolitan area network (MAN), local area network (LAN) and Internet.

Since most of the program subscribers have similar operation habits during the advertising time, by analyzing the operations, the program subscriber apparatuses 111~11n can estimate the start time and the end time of the advertisement. For example, when an advertisement starts, the viewer may press the PIP mode button on the remote controller. It is also practical to additionally provide an advertisement button on the controller so that the viewer may press the advertisement button after an advertisement starts or ends. Such operation can be easily detected by the program subscriber apparatuses 111~11n. The estimated time points may not be just located at the precise start time and end time of the advertisement. However, they are close enough to be used for processing or recording the program.

Figure 3:
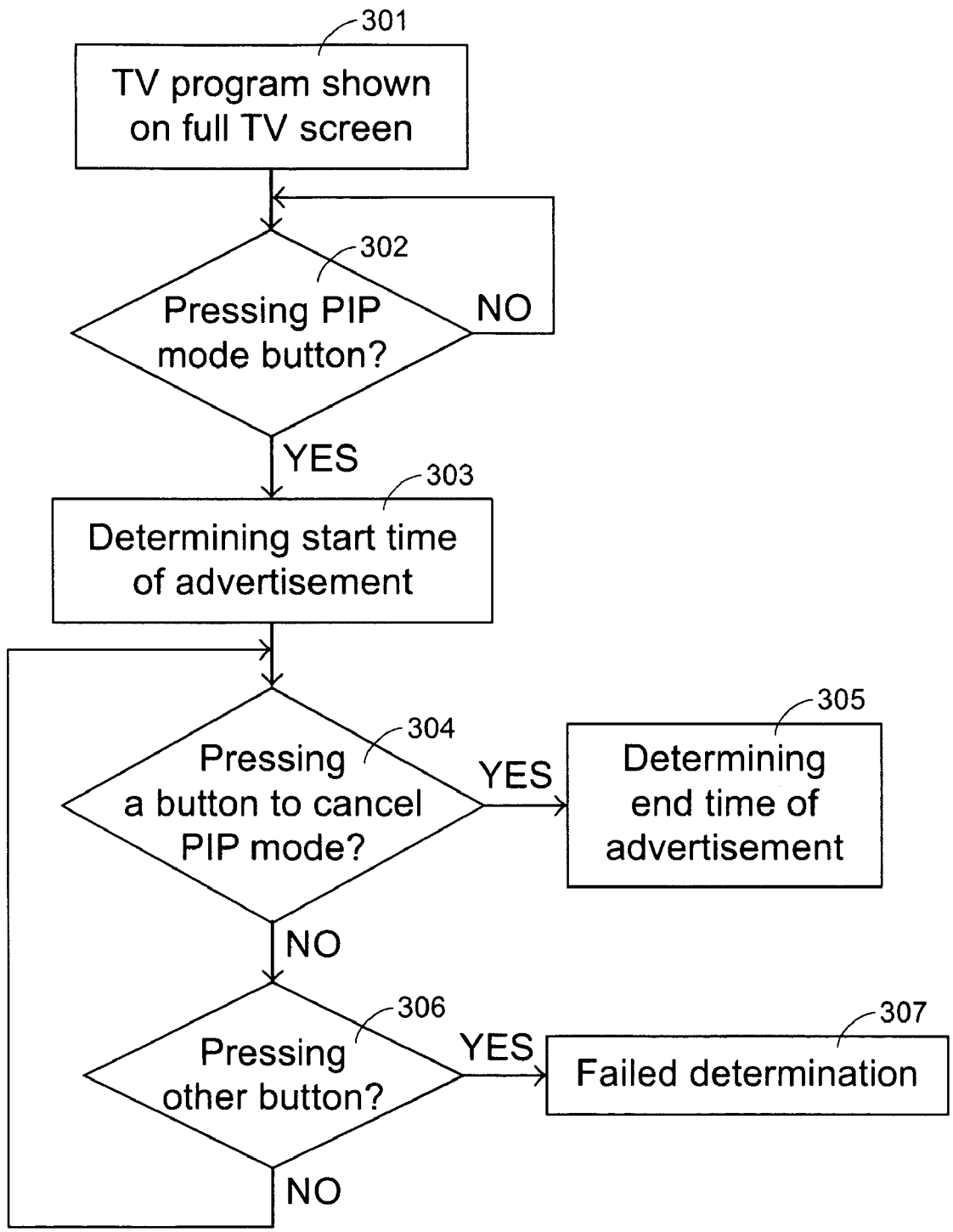
FIG. 3 is a flow chart showing a first embodiment of collecting advertising time information according to program subscriber's operations.

FIG. 3 is a flow chart showing a first embodiment of collecting advertising time information according to program subscriber's operations. In step 301, the program on channel A is shown on full TV screen. Once the viewer sees that an advertisement starts, the most possible operation is to press the PIP mode button to enter the PIP mode. The advertisement is shown in a sub-frame and the main frame is tuned to other channel B. Hence, in step 302, the system detects when the PIP mode button is pressed and the sub-frame shows video signals from channel A. In step 303, the detected time point is designated as the start time of the advertisement. The start time together with the channel number is sent to the advertising time sever 10 through the network 13.

In the PIP mode, the viewer can watch the program on channel B and wait for the program on channel A by glancing at the sub-frame. If the viewer is conscious that the program on channel A continues, the viewer most likely cancels the PIP mode and makes the program on channel A return to normal mode, i.e. shown on full TV screen. The PIP mode may be cancelled by pressing a designated button to return to the normal mode or pressing the PIP mode button again. Hence, in step 304, the system detects when the PIP mode is cancelled and the normal frame shows video signals from channel A. In step 305, the detected time point is designated as the end time of the advertisement. The end time together with the channel number is sent to the advertising time sever 10 through the network 13. In another embodiment, the start time is not sent to the advertising time sever 10 till the end time is decided. The start time and the end time together with the channel number is then sent to the advertising time server 10 at this stage. In other words, if the detection of end time of the advertisement fails, no advertising time information will be sent to the advertising time server 10.

If another button is pressed to show the program on channel B instead of channel A in the normal frame, it is possible that the viewer considers that the program on channel B is more interesting and will not to switch back to channel A. Hence, it fails to determine the end time of the advertisement. In step 306, if a button is pressed without making the program on channel A be shown in the normal frame again, it is determined that the detection of the end time of the advertisement fails.

Figure 4A:
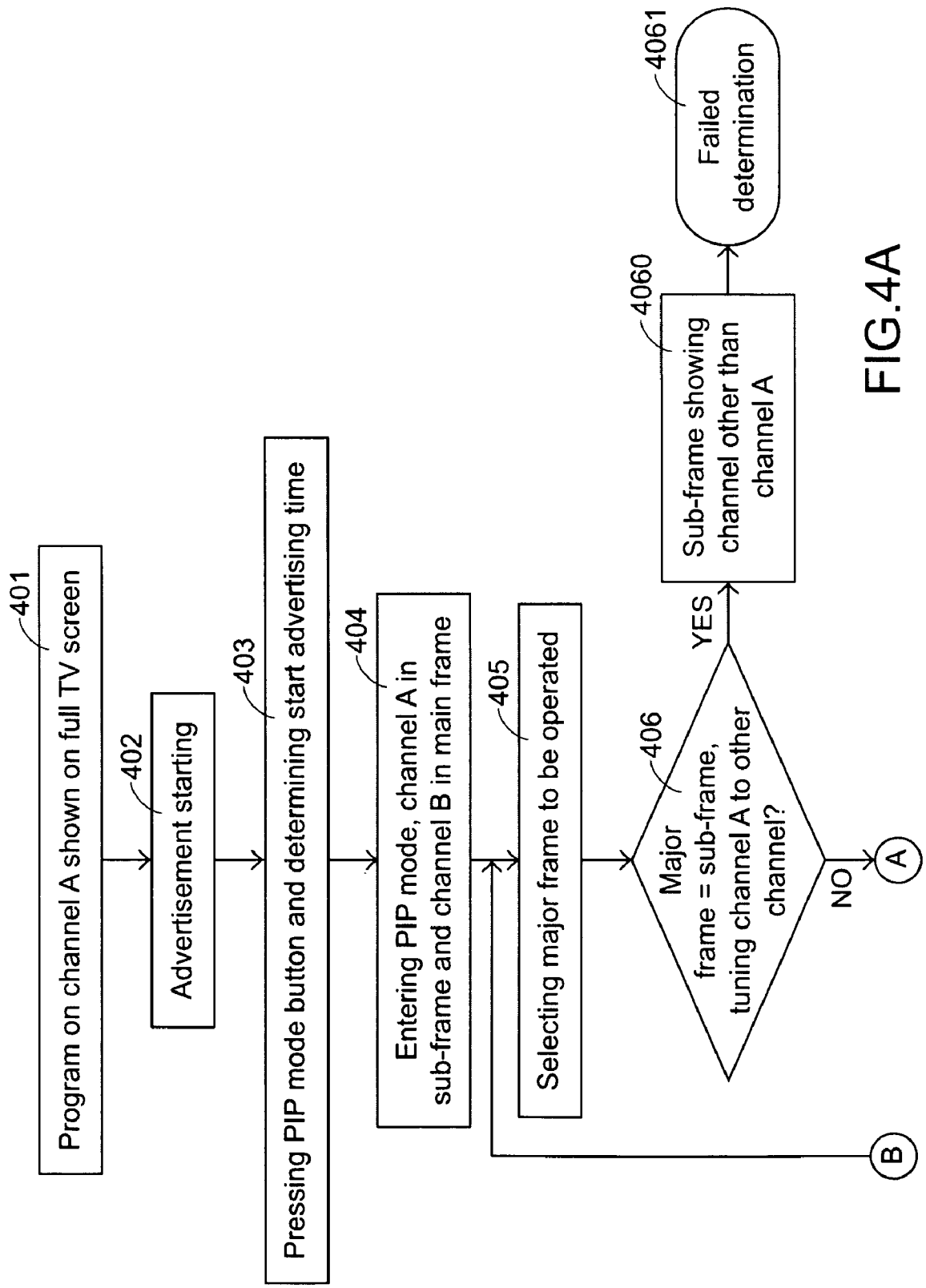
FIG. 4 is a flow chart showing a second embodiment of collecting advertising time information according to program subscriber's operations.
Figure 4B:
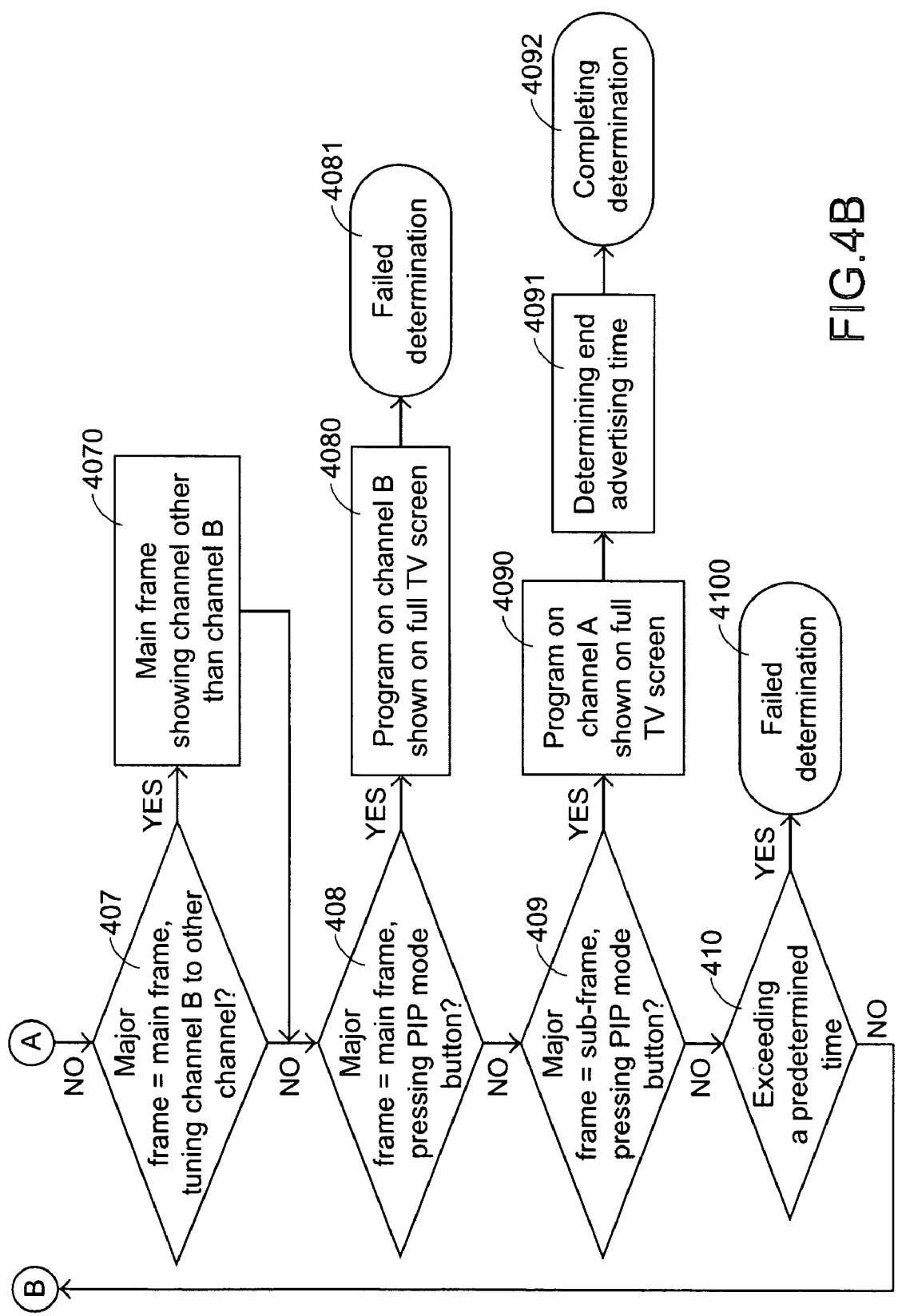

FIG. 4 is a flow chart showing a second embodiment of collecting advertising time information according to program subscriber's operations. More determinations are made in this embodiment to provide better detection of the advertising time. Firstly, the program on channel A is shown on full TV screen (step 401). When the viewer sees that an advertisement starts (step 402), the viewer likely presses the PIP mode button (step 403). The detected time point is designated as a start time of the advertisement on channel A. The program subscriber apparatus 111~11n enters the PIP mode and video signals of channel A and channel B are shown in sub-frame and main frame, respectively (step 404). The viewer may use a function button to select the main frame or sub-frame as major frame to be operated (step 405). There are some possible paths shown as follows.

If the sub-frame (channel A) is selected as the major frame and is tuned to other channel (step 406), the sub-frame shows video signals of the selected channel other than channel A (step 4060). Hence, the system fails to determine the end time of the advertisement on channel A (step 4061).

If the main frame (channel B) is selected as the major frame and a channel up or down button is pressed (step 407), the main frame is switched to other channel (step 4070). Under this condition, the operation does not affect the advertisement show on channel A displayed in the sub-frame. Hence, the system continues the detection.

If the main frame (channel B) is selected as the major frame and the viewer presses the PIP mode button to cancel the PIP mode (step 408), the program subscriber apparatus 111~11n returns to the normal mode. The program on channel B is shown on full screen (step 4080). The viewer stops waiting for the program on channel A, so the system fails to determine the end time of the advertisement on channel A (step 4081).

If the sub-frame (channel A) is selected as the major frame and the viewer presses the PIP mode button to cancel the PIP mode (step 409), the program subscriber device 111~11n returns to the normal mode. The program on channel A is shown on full screen (step 4090). It is possible that the advertisement on channel A ends so the viewer comes back to watch the program on channel A. Hence, the detected time point is designated as an end time of the advertisement on channel A (step 4091). The system succeeds in determining the start time and the end time of the advertisement on channel A (step 4092).

If the program subscriber device 111~11n enters the PIP mode and no related operation is made more than a possible advertising time length (step 410), it is suspected that the viewer may leave the program subscriber device 111~11n. Hence, the system fails to determine the end time of the advertisement on channel A (step 4100).

According to the present invention, the start time and the end time can be sent to the advertising time server 10 after step 403 and step 4091, respectively or simultaneously sent after step 4091. The advertising time server 10 receives the advertising time information of various programs on various channels. Besides, a user code may be sent to the advertising time server 10 so that the advertising time server 10 may judge whether the received advertising time information should be discarded according to the user code. Then, the advertising time server 10 performs a statistical method to determine the representative start time and end time of the advertisements for every program. For example, the advertising time server 10 saves in a data field a plurality of start times and end times, corresponding to a specific channel, received from the same or different program subscriber apparatuses 111~11n located at the same broadcast area. When the advertising time server 10 collects enough data, it analyzes the data by a statistic method to determine the representative start time and end time of the advertisements, e.g. using average value or median value. The collected time values deviating the time range too much can be filter out before the statistical method to increase the accuracy. Then, the representative time values, the channel number and the broadcast information are stored in the advertising time database 101.

By connecting the program-processing device 12 to the advertising time server 10, the program-processing device 12 can process the program according to the information stored in the advertising time database 101. In one embodiment, the program-processing device 12 is a recording device and a scheduled recording operation is performed. The recording device accesses the representative start time and end time of the advertisement from the advertising time server 10 through the network 13. As the description with reference to FIG. 2, the recording device may stop recording during the advertising time, insert two markers corresponding to the start and the end of the advertisement to the recorded file, or insert only one marker corresponding to the end of the advertisement.

In another embodiment, the recording device performs a playback operation. The recorded file includes advertisements inserted in the program. The recording device accesses the representative start time and end time of the advertisement on the corresponding channel from the advertising time sever 10 through the network 13. During the advertising time of the playback, the recording device may skip the advertisement or insert substitute video sections.

Since the advertising time is provided by a dedicated server, it is not necessary for the recording device to perform complicated computations to compare sequential frames to detect the advertisement. Furthermore, the accuracy of the detection of the present invention is not affected by the color level of the advertisements. No additional staff costs are incurred but the program subscriber apparatuses located everywhere can provide advertising time information to assist with the detection of the advertisements. Therefore, the present invention provides a program-processing system with simple structure and satisfactory accuracy in detecting advertisement compared with the prior arts. The effective method for detecting advertisement inserted in the program applied to the system also overcomes the problems such as complicated computations involved in the conventional advertisement detection method.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A program-processing system operated with a network, comprising:
    a plurality of program subscriber apparatuses in communication with the network and generating a plurality of advertising time information of a specific program on a particular channel, in response to the operations of the program subscriber apparatuses;
    an advertising time server in communication with the network for providing an advertising time database having therein a plurality of representative advertising time information obtained according to the plurality of advertising time information; and
    a program-processing device in communication with the network for accessing the representative advertising time information corresponding to the specific program from the advertising time database through the network and processing the specific program according to the corresponding representative advertising time information;
    wherein each of the plurality of program subscriber apparatuses is equipped with a picture-in-picture (PIP) button used to toggle a PIP mode on the respective program subscriber apparatus upon actuation by a user, said PIP mode comprising the steps of:
        displaying the specific program in a sub frame of the respective program subscriber apparatus;
        displaying alternative programming in a main frame of the respective program subscriber apparatus while the PIP mode is in effect; and
        upon actuation of the PIP button, generating and transmitting the representative advertising time information to the advertising time server through the network, restoring the specific program to the main frame of the respective program subscriber apparatus, and terminating said PIP mode;
    wherein the representative advertising time information comprises:
        a start time of an advertisement on the particular channel, corresponding to the initiation of the PIP mode;
        an end time of an advertisement on the particular channel, corresponding to the termination of the PIP mode; and
        a channel number, corresponding to the particular channel of the specific program.

2. The program-processing system according to claim 1 wherein each of the program subscriber apparatuses is one selected from a group consisting of a TV set, a computer and a set top box.

3. The program-processing system according to claim 1 wherein the program-processing device is a video recording/reproducing device in communication with the network.

4. The program-processing system according to claim 1 wherein the network is one selected from a group consisting of a wide area network, a metropolitan area network, a local area network and Internet.

5. A program-processing method used with a network, comprising steps of:
    providing an advertising time database having therein a plurality of representative advertising time information obtained according to a plurality of advertising time information of a specific program on a particular channel; and
    accessing the representative advertising time information corresponding to the specific program from the advertising time database through the network and processing the specific program according to the corresponding representative advertising time information;
    toggling a PIP mode on a plurality of the respective program subscriber apparatus upon actuation of a picture-in-picture (PIP) button by a user, said PIP mode comprising the steps of:
        displaying the specific program in a sub frame of the respective program subscriber apparatus;
        displaying alternative programming in a main frame of the respective program subscriber apparatus while the PIP mode is in effect; and
        upon actuation of the PIP button, generating and transmitting the representative advertising time information to the advertising time database through the network, restoring the specific program to the main frame of the respective program subscriber apparatus, and terminating said PIP mode;
    wherein the representative advertising time information comprises:
        a start time of an advertisement on the particular channel, corresponding to the initiation of the PIP mode;
        an end time of an advertisement on the particular channel, corresponding to the termination of the PIP mode; and
        a channel number, corresponding to the particular channel of the specific program.

6. The program-processing method according to claim 5 wherein the plurality of advertising time information are generated in response to the operations of a plurality of program subscriber apparatuses.

7. The program-processing method according to claim 6 wherein the advertising time database is provided by steps of:
    storing the plurality of the advertising time information in a data field;
    performing a statistic method when the amount of the advertising time information exceeds a predetermined value to get a representative start time and a representative end time of the advertisement; and
    saving the representative start time, the representative end time, and the channel number in the advertising time database.

8. The program-processing method according to claim 5, before the step of accessing the representative advertising time information, further comprising a step of connecting an advertising time server having the advertising time database and accessing a start time and an end time of an advertisement inserted in the specific program.

9. The program-processing method according to claim 8 wherein when the specific program is processed by a recording operation, the program-processing method further comprises one step selected from the steps of:
    stopping recording between the start time and the end time of the advertisement;

two markers, corresponding to the start time and the end time of the advertisement, to the recorded file;

inserting a marker corresponding to the end time of the advertisement; and inserting a predetermined video section to substitute the advertisement.

10. The program-processing method according to claim 8 wherein when the specific program is processed by a playback operation, the program-processing method further comprises on step selected from the steps of:

skipping playback of the advertisement; and performing a playback of a substitute video section.

11. An advertisement detection system operated with a network, comprising:

a plurality of program subscriber apparatuses in communication with the network and generating a plurality of advertising time information of a specific program on a particular channel, in response to the operations of the program subscriber apparatuses; and an advertising time server in communication with the network for providing an advertising time database having therein a plurality of representative advertising time information by integrating the plurality of advertising time information;

wherein each of the plurality of program subscriber apparatuses is equipped with a picture-in-picture (PIP) button used to toggle a PIP mode on the respective program subscriber apparatus upon actuation by a user, said PIP mode comprising the steps of:

displaying the specific program in a sub frame of the respective program subscriber apparatus;

displaying alternative programming in a main frame of the respective program subscriber apparatus while the PIP mode is in effect; and upon actuation of the PIP button, generating and transmitting the representative advertising time information to the advertising time server through the network, restoring the specific program to the main frame of the respective program subscriber apparatus, and terminating said PIP mode;

wherein the representative advertising time information comprises:

a start time of an advertisement on the particular channel, corresponding to the initiation of the PIP mode;

an end time of an advertisement on the particular channel, corresponding to the termination of the PIP mode; and a channel number, corresponding to the particular channel of the specific program.

12. The advertisement detection system according to claim 11 wherein each of the program subscriber apparatuses is one selected from a group consisting of a TV set, a computer and a set top box.

13. An advertisement detection method used with a network, comprising steps of:

generating a plurality of advertising time information of a specific program on a particular channel, in response to the operations of a plurality of program subscriber apparatuses; and providing an advertising time database having therein a plurality of representative advertising time information by integrating the plurality of advertising time information;

toggling a PIP mode on a plurality of the respective program subscriber apparatus upon actuation of a picture-in-picture (PIP) button by a user, said PIP mode comprising the steps of:

displaying the specific program in a sub frame of the respective program subscriber apparatus;

displaying alternative programming in a main frame of the respective program subscriber apparatus while the PIP mode is in effect; and upon actuation of the PIP button, generating and transmitting the representative advertising time information to the advertising time database through the network, restoring the specific program to the main frame of the respective program subscriber apparatus, and terminating said PIP mode;

wherein the representative advertising time information comprises:

a start time of an advertisement on the particular channel, corresponding to the initiation of the PIP mode;

an end time of an advertisement on the particular channel, corresponding to the termination of the PIP mode; and a channel number, corresponding to the particular channel of the specific program.

14. The advertisement detection method according to claim 13 wherein the advertising time database is provided by steps of:

storing the plurality of advertising time information in a data field;

performing a statistic method when the amount of the advertising time information exceeds a predetermined value to get a representative start time and a representative end time of the advertisement; and saving the representative start time, the representative end time, and the channel number in the advertising time database.

15. A method for determining an advertising time of an advertisement inserted in a TV program broadcast on a program subscriber apparatus, comprising steps of:

toggling a PIP mode on the program subscriber apparatus upon actuation of a picture-in-picture (PIP) button by a user, said PIP mode comprising the steps of:

displaying the specific program in a sub frame of the program subscriber apparatus;

displaying alternative programming in a main frame of the program subscriber apparatus while the PIP mode is in effect; and upon actuation of the PIP button, generating and transmitting the representative advertising time information to an advertising time database through the network, restoring the specific program to the main frame on the program subscriber apparatus, and terminating said PIP mode;

wherein the representative advertising time information comprises:

a start time of an advertisement on the particular broadcast channel, corresponding to the initiation of the PIP mode;

an end time of an advertisement on the particular broadcast channel, corresponding to the termination of the PIP mode; and a channel number, corresponding to the particular broadcast channel of the specific program.

* * * * *